(12) United States Patent
Nabe et al.

(10) Patent No.: US 7,471,613 B2
(45) Date of Patent: Dec. 30, 2008

(54) OPTICAL PICKUP DEVICE

(75) Inventors: Mitsuhiro Nabe, Ota (JP); Kenichi Takeuchi, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 651 days.

(21) Appl. No.: 11/112,207

(22) Filed: Apr. 22, 2005

(65) Prior Publication Data

US 2005/0237868 A1    Oct. 27, 2005

(30) Foreign Application Priority Data

Apr. 27, 2004    (JP)    .............................. 2004-131172
Dec. 20, 2004    (JP)    .............................. 2004-367434

(51) Int. Cl.
*G11B 7/00* (2006.01)
(52) U.S. Cl. ..................................... 369/122
(58) Field of Classification Search ........................ None
See application file for complete search history.

(56) References Cited

U.S. PATENT DOCUMENTS

| | | | |
|---|---|---|---|
| 5,050,154 A * | 9/1991 | Shimozawa et al. .... | 369/112.23 |
| 7,046,614 B2 * | 5/2006 | Koga ........................... | 369/120 |
| 2004/0095872 A1 * | 5/2004 | Miyashige ............. | 369/112.23 |
| 2004/0136310 A1 * | 7/2004 | Park et al. ................... | 369/121 |

FOREIGN PATENT DOCUMENTS

| | | | |
|---|---|---|---|
| JP | 63053730 A | * | 3/1988 |
| JP | 5173215 | | 7/1993 |
| JP | 8330674 | | 12/1996 |
| JP | 2000-163756 | | 6/2000 |
| JP | 2003-067958 | | 3/2003 |
| JP | 2003-292763 A | | 10/2003 |
| JP | 2004103084 | | 4/2004 |

OTHER PUBLICATIONS

State Intellectual Property Office of P.R. China, "Notification of First Office Action," (Jul. 14, 2006).
Chinese Patent Office: Notification of First Office Action for patent application No. 200710086096.8, dated Jun. 6, 2008.

* cited by examiner

*Primary Examiner*—Joseph H Feild
*Assistant Examiner*—Peter Vincent Agustin
(74) *Attorney, Agent, or Firm*—Pillsbury Winthrop Shaw Pittman LLP

(57) ABSTRACT

An optical pickup device comprises a light emitting element for emitting a laser beam, and a housing in which the light emitting element is mounted, wherein the light emitting element is contained in a holder for protecting the light emitting device, the holder including a projecting portion for dissipating heat generated by the light emitting element, and the projecting portion is located within the housing. Thus, an optical pickup device having a light emitting element held in a holder which is superior in heat dissipation and is resistant to damage can be provided.

8 Claims, 7 Drawing Sheets

OPTICAL PICKUP DEVICE

CROSS-REFERENCE TO RELATED APPLICATIONS

The entire disclosure of Japanese Patent Applications Nos. 2004-367434 and 2004-131172 including specification, claims, drawings and abstract is incorporated herein by reference.

BACKGROUND OF THE INVENTION

1. Field of the Invention

The present invention relates to an optical pickup device having a light emitting element provided in a holder which is superior in heat dissipation and is resistant to damage.

2. Description of Related Art

FIG. 7 shows an embodiment of a conventional optical pickup device.

Laser diodes (abbreviated as "LDs") emit a laser beam and are also referred to as light emitting elements. LD drivers will be hereinafter abbreviated as "LDDs". Referring to FIG. 7, an LDD 510 is a laser drive circuit for driving an LD 520 to cause the LD 520 to emit a laser beam. Electric current from the LDD 510 is supplied to the LD 520, which then emits a laser beam for recording information on a disk 700 and/or reading information recorded on the disk 700.

The laser beam which is emitted from the LD 520 is irradiated, through a diffraction grating 530, an intermediate lens 540, a half mirror 550, and an objective lens 560, onto the disk 700. A part of the laser beam reflected by the disk 700 impinges on a photo diode IC (which will be abbreviated as PDIC) 570. The PDIC 570 converts a light signal indicative of the received light beam into an electric signal, which is used to operate a servo mechanism (not shown) of a lens holder (not shown) of an optical pickup device 501. PDICs, which detect light irradiated thereto, are also referred to as photo detectors. The servo as described herein refers to a mechanism which measures a state of a control object and compares the measurement result with a predetermined reference value for automatically performing correction control.

Further, a part of the laser beam output from the LD 520 enters a front monitor diode (FMD) 580. The FMD monitors laser beams emitted by the laser diode for providing feedback to control the laser diode.

The LDD 510, the LD 520, the diffraction grating 530, the intermediate lens 540, the half mirror 550, the objective lens 560, the PDIC 570, and FMD 580 are mounted in a housing which is not shown. Further, the LDD 510, the LD 520, the PDIC 570, and the FMD 580 are connected to a flexible printed circuit (FPC) 505 so that electrical connection can be achieved therebetween. A flexible printed circuit (which will be hereinafter abbreviated as FPC) is formed by providing a metal foil such as a copper foil in parallel with an insulating sheet on which a plurality of circuit conductors are printed, and further providing a protective layer thereon. The optical pickup device 501 includes various elements as described above. Here, while the optical pickup device 501 includes structural elements (not shown) other than those described above, these elements are omitted in FIG. 7 for the sake of convenience.

The optical pickup device 501 is used for reading or recording data such as information in media. Here, the media include various types of optical disks including, for example, read-only optical disks such as CD-ROMs and DVD-ROMs, recordable (write-once) optical disks such as CD-Rs and DVD±Rs, and writable/erasable or rewritable optical disks such as CD-RWs, DVD±RWs, and DVD-RAMs.

Here, "CD" is an abbreviation of a Compact Disk, and "DVD" is an abbreviation of a Digital Versatile Disk. Further, "ROM" in "CD-ROM" or "DVD-ROM" is an abbreviation of Read Only Memory, and therefore "CD-ROMs" or "DVD-ROMs" are read-only disks. Further, "R" in "CD-Rs" or "DVD±Rs" is an abbreviation of Recordable, and therefore "CD-Rs" or "DVD±Rs" are recordable disks. In addition, "RW" in "CD-RWs" or "DVD±RWs" is an abbreviation of Re-Writable, and therefore "CD-RWs" or "DVD±RWs" are rewritable disks. Also, "DVD-RAM" is an abbreviation of Digital Versatile Disk Random Access Memory, and is therefore readable, writable and erasable.

The optical pickup device 501 is used for reading data recorded on various optical disks or for recording data on various recordable or rewritable optical disks.

By supplying electric current to the LDD 510, the LD 520 emits a laser beam. At this time, the LD 520 generates heat, which causes a temperature change in the LD 520. The oscillation wavelength of laser in the LD 520 when the laser beam is emitted from the LD 520 depends on the temperature. Accordingly, as the temperature of the LD 520 changes significantly, the wavelength of the laser beam emitted from the LD 520 varies. Further, when electric current is supplied from LDD 510 to LD 520 to cause the LD 520 to emit a laser beam, the LDD 510 also generates heat. Thus, the LDD 510 and the LD 520 constitute a main heat source in the optical pickup device 501.

As one countermeasure against heat generated by the laser driver, a heat dissipation device in an optical head, in which a metal laser holder holding a semiconductor laser is coated with a heat dissipating coating having a heat dissipation effect, has been proposed.

In recent years, there has been a demand for further reduction in weight and size of an optical disk apparatus (not shown) or the optical pickup device 501 which is mounted in an optical disk apparatus. To meet such a demand, it is proposed to use a housing made of a resin, in place of a metal housing as conventionally used, for containing the LD 520, the diffraction grating 530, the intermediate lens 540, the half mirror 550, the objective lens 560, the PDIC 570 or the like, thereby achieving reduction in weight. When a metal housing is replaced by a housing made of a resin, the weight of the optical pickup device 501 can be reduced.

However, a housing made of metal is superior in heat conductivity to a housing made of resin. Therefore, when a resin housing is used in an optical pickup device, there is a problem that heat generated by the LD 520 is difficult to dissipate.

As already described above, the oscillation wavelength of laser when the laser beam is emitted from the LD 520 depends on the temperature. Accordingly, as the temperature of the LD 520 changes significantly, the wavelength of laser beam emitted from the LD 520 also changes. There is therefore a problem that when the LD 520 is heated by heat generated by the LD 520 itself, the wavelength of the laser beam emitted from the LD 520 varies and this prevents the LD 520 from emitting a laser beam at a fixed wavelength.

In order to facilitate heat dissipation of the LD (light emitting element) 520, it is proposed that a large number of heat dissipation fins (not shown) be provided on the LD (light emitting element) 520 or the fixing members of the LD (light emitting element) 520, for example. This proposed structure, however, causes another problem that provision of a large number of heat dissipation fins increases the size of the optical pickup device 501.

There is also a demand, from assembling manufacturers of an optical pickup device or assembling manufacturers of an optical disk apparatus, for optical pickup devices which can resist somewhat rough handling.

SUMMARY OF THE INVENTION

The present invention provides an optical pickup device comprising a light emitting element for emitting a laser beam and a housing in which the light emitting element is mounted, wherein the light emitting element is contained in a holder for protecting the light emitting element, the holder including a projecting portion for dissipating heat generated by the light emitting element, and the projecting portion is located within the housing.

BRIEF DESCRIPTION OF THE DRAWINGS

A preferred embodiment of the present invention will be described in detail based on the following drawings, wherein.

DETAILED DESCRIPTION OF PREFERRED EMBODIMENT

A preferred embodiment of an optical pickup device according to the present invention will be described in detail based on the accompanying drawings.

Figure 1:
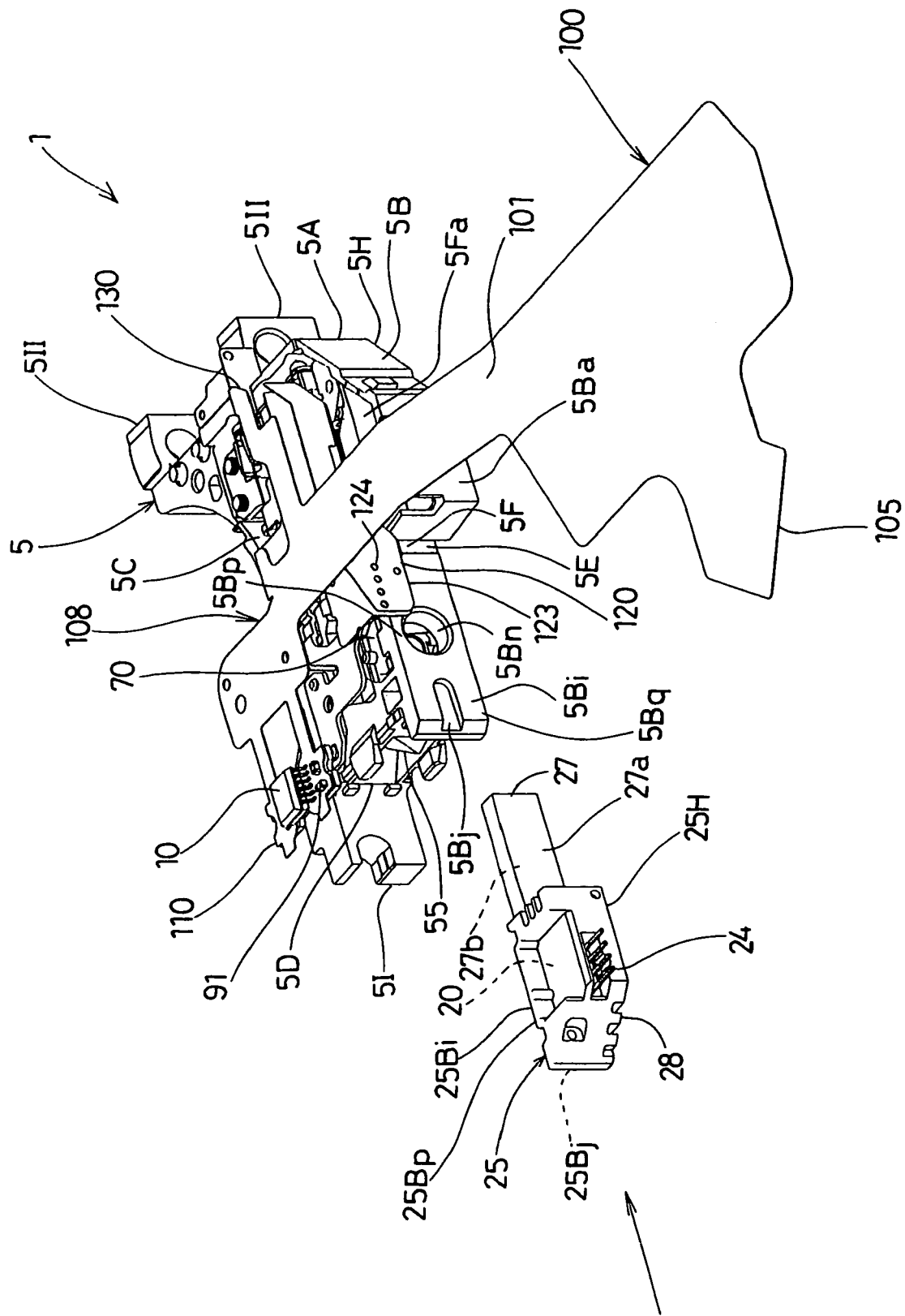
FIG. 1 is a decomposed perspective view showing an optical pickup device according to one embodiment of the present invention.
Figure 2:
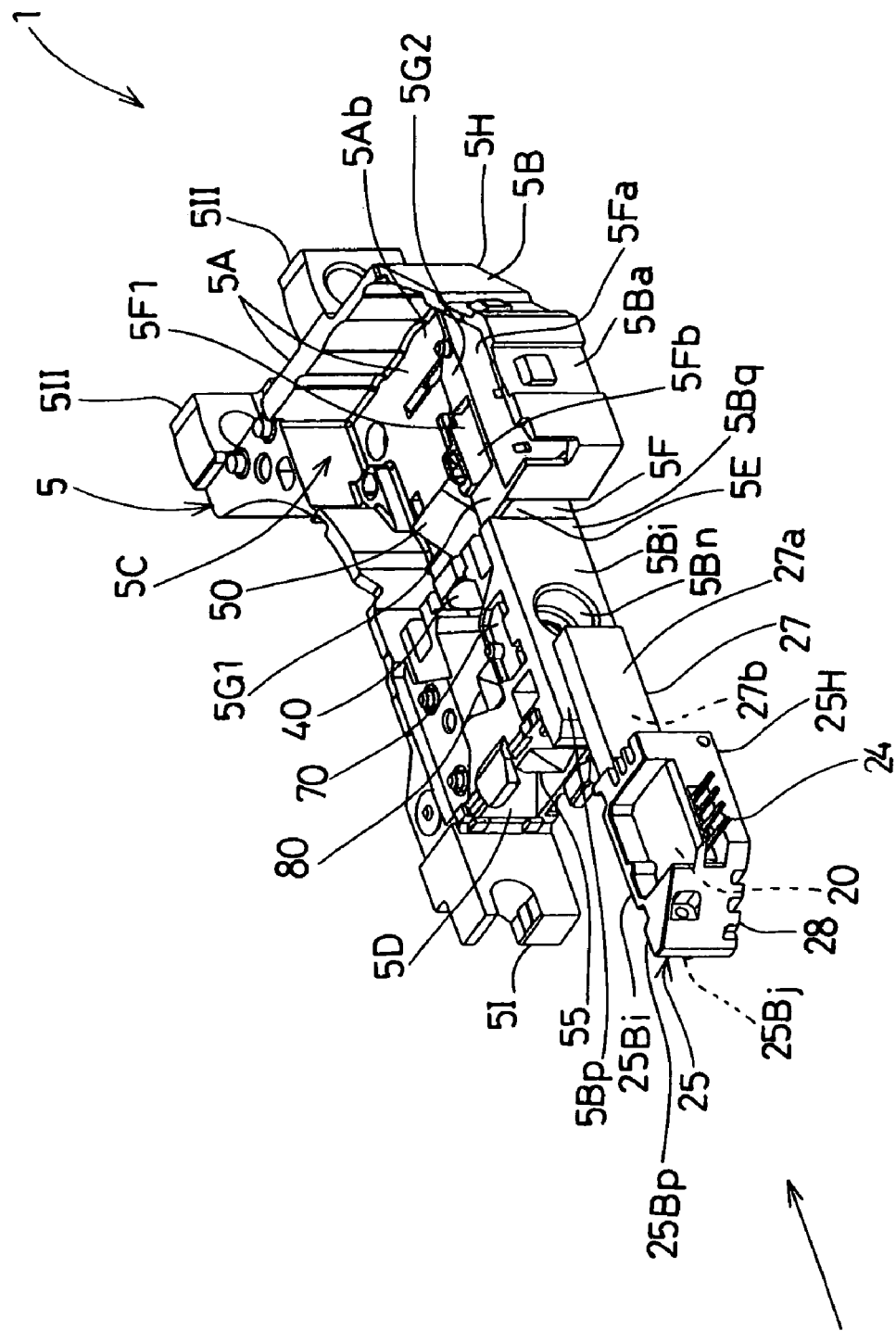
FIG. 2 is a decomposed perspective view showing a state where a holder containing a light emitting element is to be mounted onto a housing.
Figure 3:
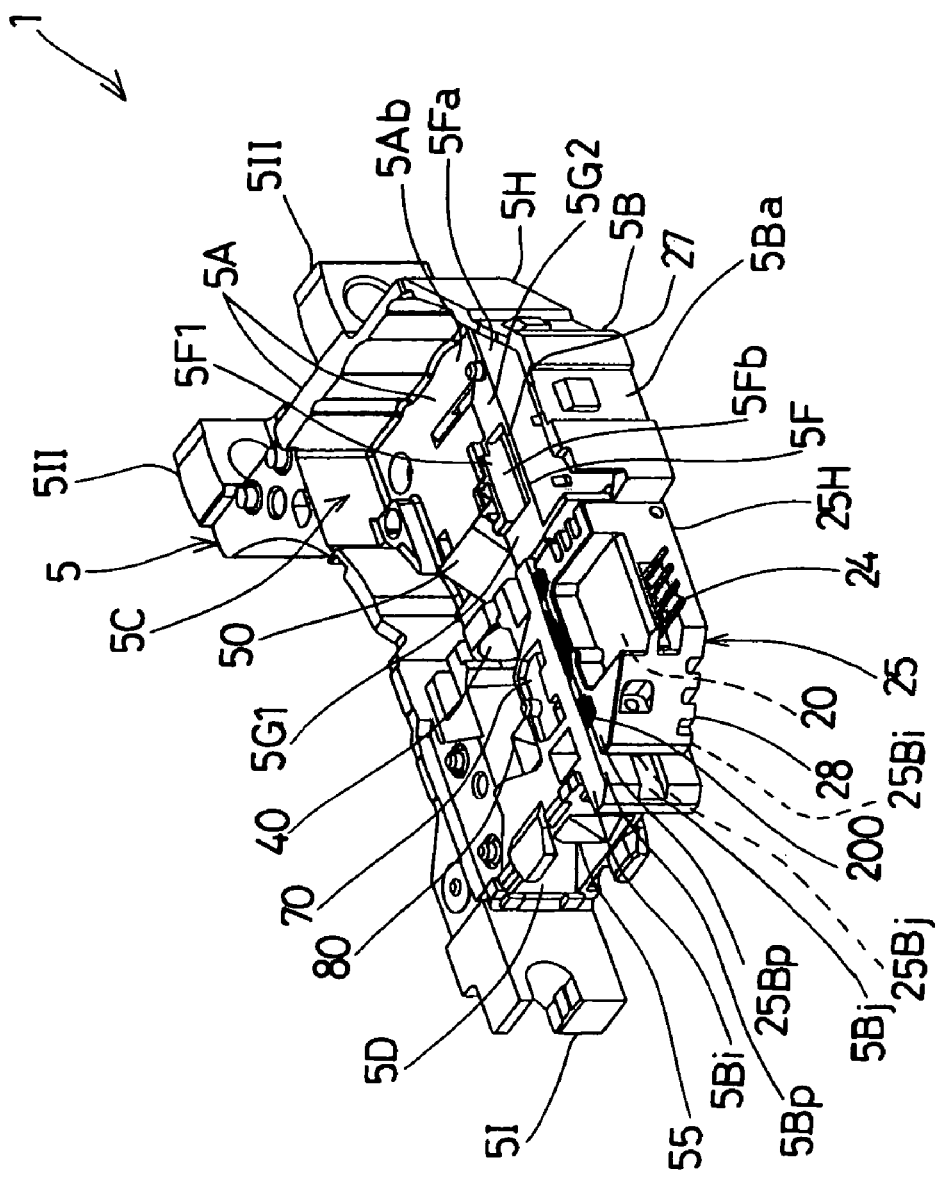
FIG. 3 is a perspective view showing a state where a holder containing a light emitting element has been mounted onto a housing.
Figure 4:
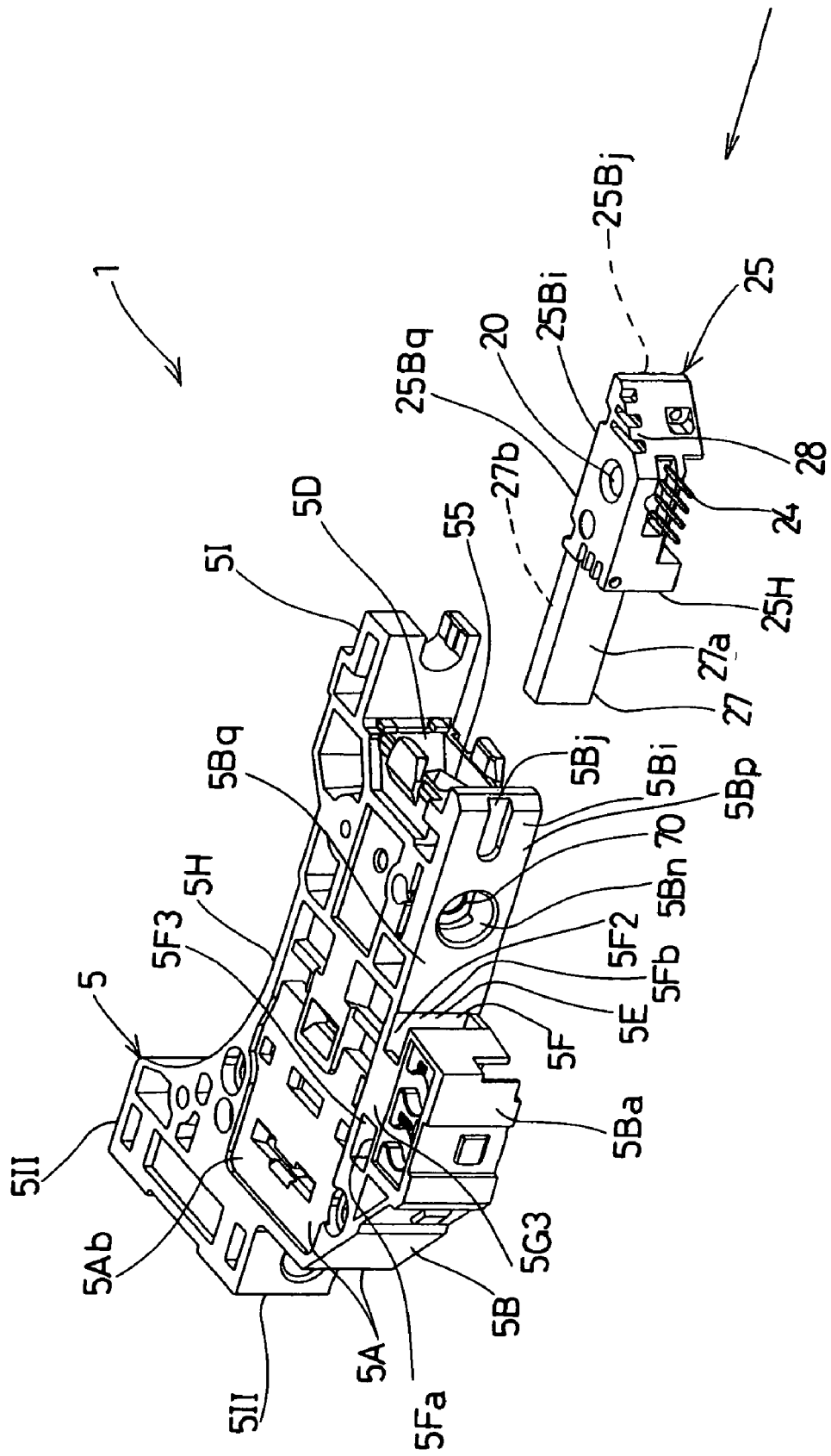
FIG. 4 is another decomposed perspective view showing a state where a holder containing a light emitting element is to be mounted onto a housing.
Figure 5:
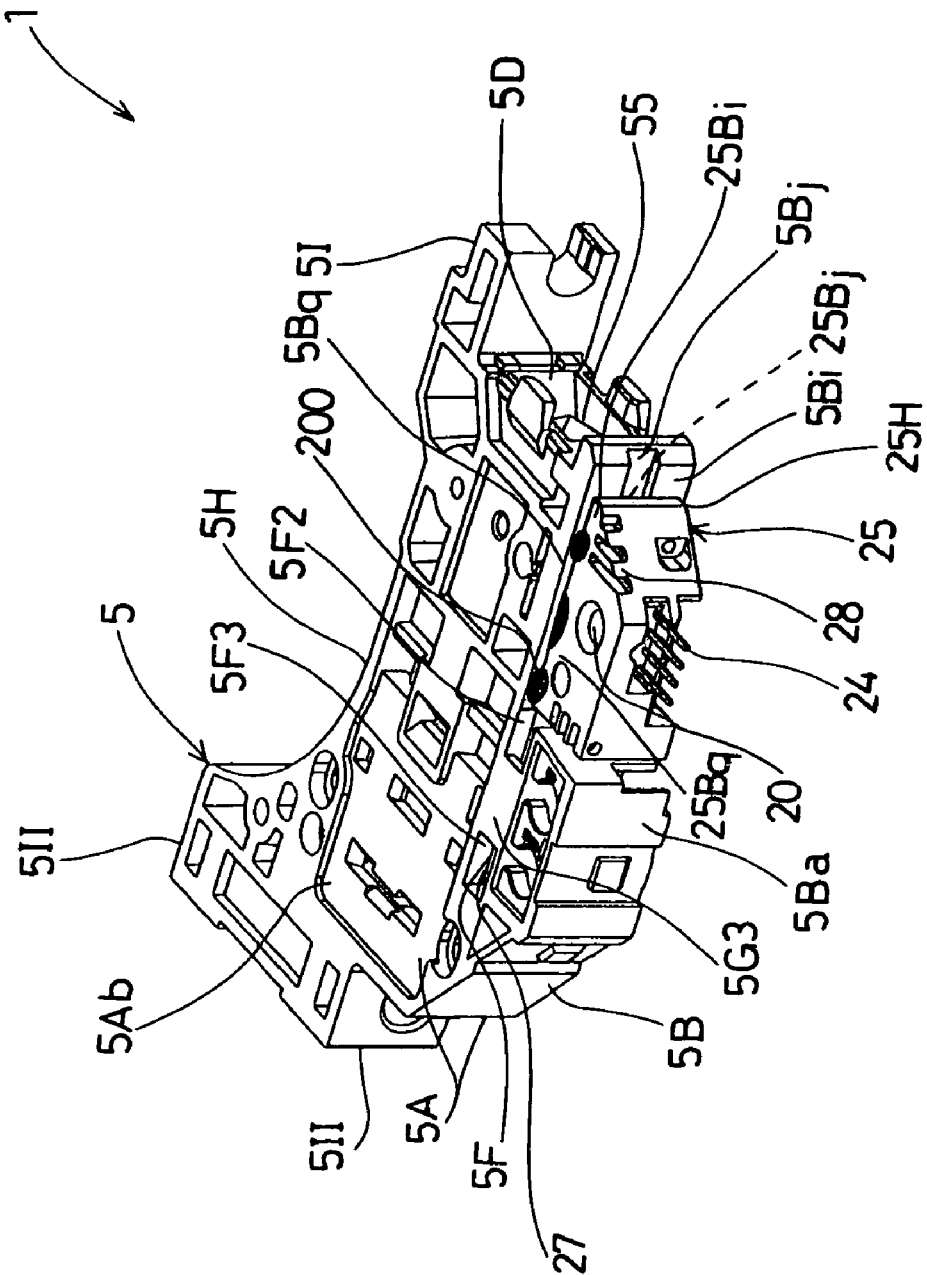
FIG. 5 is another perspective view showing a state where a holder containing a light emitting element has been mounted onto a housing.
Figure 6:
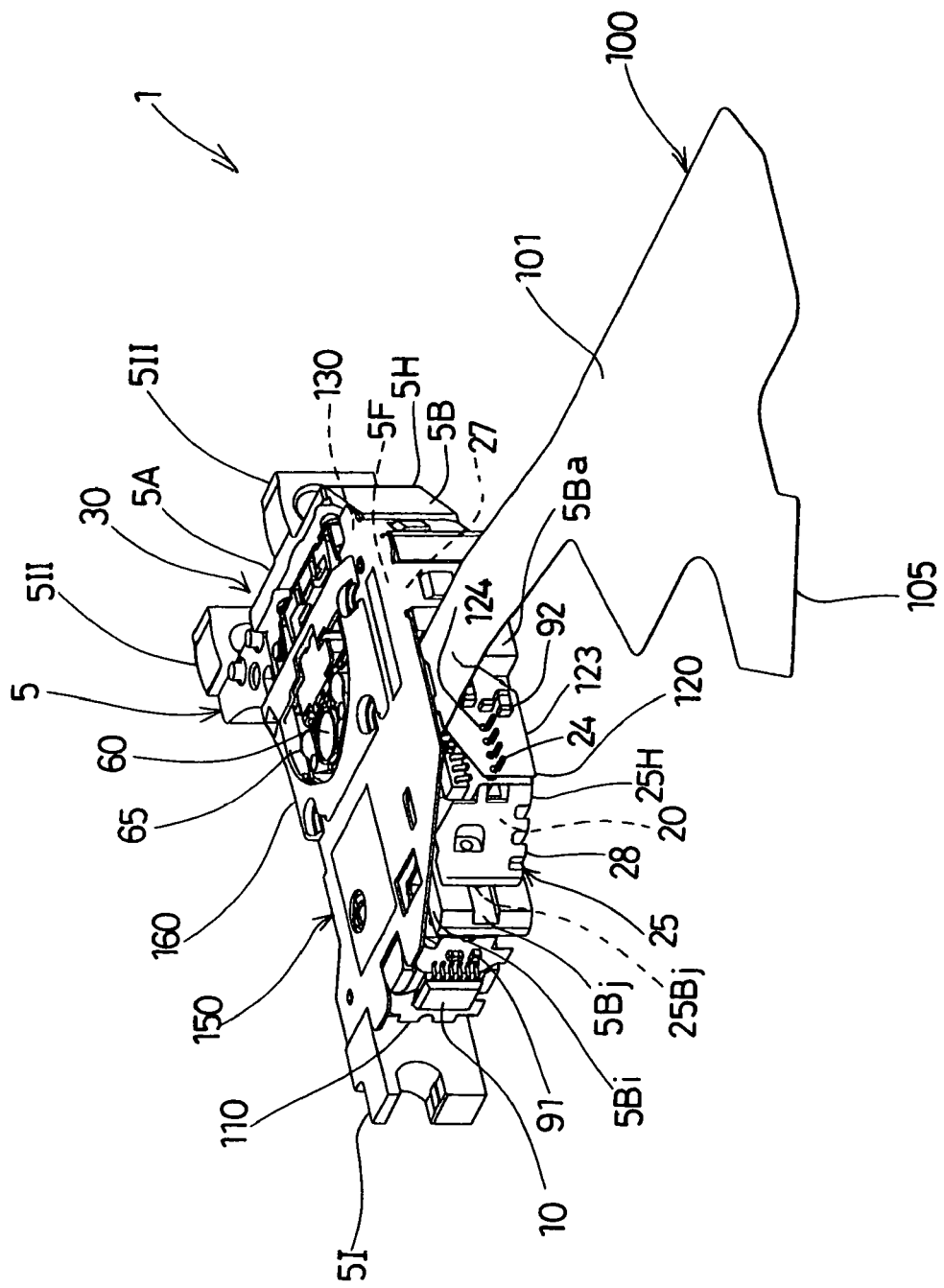
FIG. 6 is a perspective view showing an optical pickup device in an assembled state.
Figure 7:
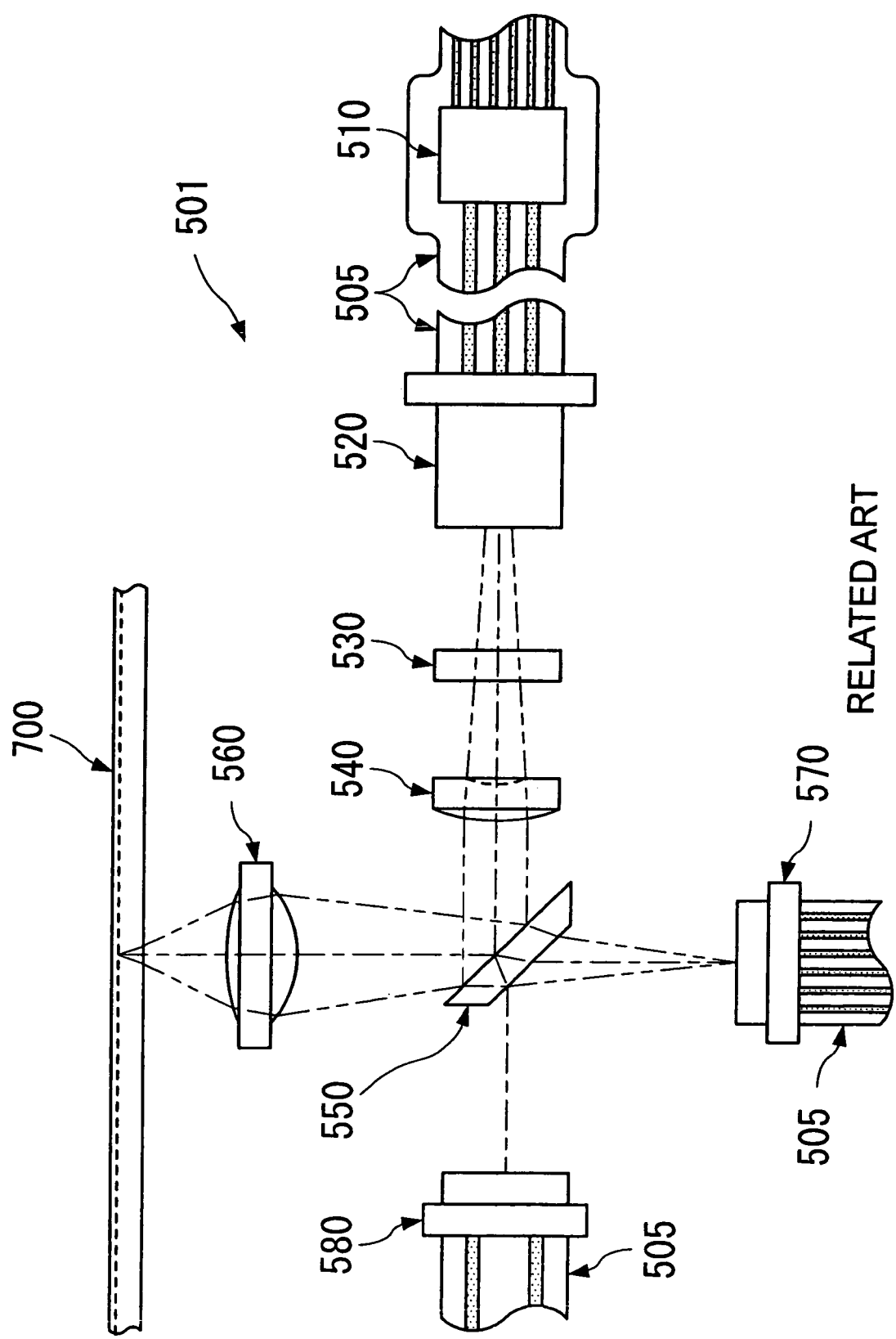
FIG. 7 is an explanatory view showing one embodiment of an optical pickup device of the related art.

FIG. 1 is a decomposed perspective view showing an optical pickup device according to one embodiment of the present invention. FIG. 2 is a decomposed perspective view showing a state where a holder containing a light emitting element is to be mounted onto a housing. FIG. 3 is a perspective view showing a state where a holder containing a light emitting element has been mounted onto a housing. FIG. 4 is another decomposed perspective view showing a state where a holder containing a light emitting element is to be mounted onto a housing. FIG. 5 is another perspective view showing a state where a holder containing a light emitting element has been mounted onto a housing. FIG. 6 is a perspective view showing an optical pickup device in an assembled state.

FIGS. 1, 2, 3 and 6 are perspective views of an optical pickup device seen from the upper surface side, and FIGS. 4 and 5 are perspective views of the optical pickup device seen from the lower surface side. It should be noted that the terms "upper" and "lower" are used in the description for the sake of convenience so as to explain an optical pickup device.

An optical pickup is abbreviated as an "OPU". An optical disk apparatus (not shown) equipped with an optical pickup device is used to read data such as information recorded on an optical disk. The optical disk apparatus is also used to record data such as information onto an optical disk. The optical disks include, for example, read-only optical disks such as "CD-ROMs" and "DVD-ROMs", recordable (write-once) optical disks such as "CD-Rs, "DVD–Rs", and a "DVD+Rs", and writable/erasable or rewritable optical disks such as "CD-RWs", "DVD–RWs", "DVD+RWs", "DVD-RAMs", "HD DVDs", and "Blu-ray Disks".

"HD DVD" is an abbreviation of a High Definition DVD. "HD DVDs" are optical disks which achieve compatibility with the conventional DVDs while simultaneously realizing a larger storage capacity than that of the conventional DVDs. While laser of red color is used for the conventional CDs and DVDs, blue violet laser is used for reading data recorded on an optical disk of "HD DVD". Here, "Blu-ray" refers to blue violet laser which is adopted for achieving higher density recording than that achieved by red laser which has been used for reading and writing of a signal with respect to the conventional CDs and DVDs.

Electric current is supplied from a laser driver (not shown) to a light emitting element 20 (FIGS. 1 to 6), which then emits a laser beam. The laser driver is a laser drive circuit which drives the light emitting element 20 to cause the light emitting element 20 to emit a laser beam.

The light emitting element 20 emits a laser beam at a wavelength of about 770 to 805 nm (nanometers) for playing back a CD. Further, the light emitting element 20 emits a laser beam at a wavelength of about 630 to 670 nm (nanometers) for playing back a DVD. Thus, the light emitting element 20 is configured as a two-wavelength laser diode capable of emitting light beams at different wavelengths. The use of such a two-wavelength LD 20 contributes to reduction in the number of LD components, for example, thereby achieving reduction in size and weight of the optical pickup device 1.

The two-wavelength LD 20 is contained within a laser holder 25 which is made of a metal and is superior in heat dissipation. The laser holder 25, which houses the LD 20 therein, is referred to as an LD holder 25 and so on.

The laser beam emitted from the LD 20 by supplying electric current to the LD 20 from the laser driver is used for recording information on an optical disk or reading information recorded on an optical disk.

The laser beam emitted from the LD 20 (FIGS. 2 and 3) passes through a laser hole 5Bn (FIGS. 1, 2 and 4) provided through one side wall 5Bi of an outer peripheral wall 5B which constitutes a housing body 5H and is irradiated, via a diffraction grating 70 (FIGS. 1 to 3), a prism 80 (FIGS. 2 and 3), an intermediate lens 40, a reflect mirror 50, and objective lens 60 (FIG. 6), onto an optical disk.

The diffraction grating 70 (FIGS. 1 and 2) uses diffraction of light to divide the laser beam emitted from the LD 20 into one main beam and two sub beams. The prism 80 serves to prevent astigmatism that is caused when a laser beam for a DVD transmits therethrough. The intermediate lens 40 collects the laser beam. The reflect mirror (which will be abbreviated as "RM") 50 causes most of the laser beam to be reflected and a part of the laser beam to be transmitted. Here, a half mirror, for example, may be used in place of the reflect mirror 50. The objective lens (which will be abbreviated as an "OBL") 60 serves to cause the laser beam emitted from the LD 20 to be focused onto an optical disk such as a CD or DVD. The object lens 60 made of a synthetic resin is housed in a lens holder 65 which is also made of a synthetic resin.

A part of the laser beam reflected from the optical disk is transmitted through a half mirror 55 mounted inside the housing body 5H (FIGS. 1 to 5) and then an opening portion 5D of a substantially rectangular shape, which is provided further ahead of the half mirror 55, and impinges on a photo detector 10 (FIG. 1 and 6) provided outside the housing body 5H. The photo detector 10 is disposed on an optical axis extension line of the part of the laser beam reflected from the optical disk. The photo detector 10 receives the laser light and converts the light signal into an electric signal, and causes the lens holder 60 holding the OBL 60 to move to an appropriate position by means of a servo mechanism of an actuator 30 (FIG. 6).

The half mirror 55 (FIGS. 1 to 5), which will be abbreviated as "HM", transmits a part of laser beam and reflects a part of laser beam. As used herein, an actuator refers to a device for moving and adjusting a particular object. The actuator 30 (FIG. 6) includes a coil of a substantially rectangular cylindrical shape, which is wounded on the inner side of the lens holder 65, and a magnet which is disposed near the coil. Further, the actuator 30 includes the lens holder 65 having a coil through which current flows. The actuator 30 performs focus control and tracking control of the lens holder 65 containing the OBL 60.

Further, it is also preferable, for example, that the optical pickup device 1 shown in FIGS. 1 to 6 be provided with a front monitor diode (not shown) for monitoring a laser beam emitted from the LD 20 and providing feedback so as to control the LD 20.

The LDD, the LD 20 (FIGS. 1 and 6), the actuator 30 (FIG. 6), the PDIC 10 (FIGS. 1 and 6), and capacitors 91 (FIGS. 1 and 6) and 92 (FIG. 6) are connected to a flexible printed circuit 100 in such a manner that they can be electrically energized. Further, various electric/electronic components including the PDIC 10, the LD 20, and capacitors 91 and 92 are mounted on the flexible printed circuit 100.

As shown in FIG. 1, the flexible printed circuit 100 includes a main circuit portion 101 constituting a body of the flexible printed circuit 100, and sub circuit portions 110, 120, and 130, which are branched from the main circuit portion 101. The flexible printed circuit 100 is formed as a thin-wall circuit board which is superior in flexibility.

The flexible printed circuit 100 (FIGS. 1 and 6) includes the main circuit portion 101, a connector portion 105, a first sub circuit portion 110, a second sub circuit portion 120, and a third sub circuit portion 130. The main circuit portion 101 constitutes the main body of the flexible printed circuit 100. The connector portion 105 is formed in the main circuit portion 101 and is connected to a counterpart circuit board. The first sub circuit portion 110 extends from the main circuit portion 101 and is connected to the PDIC 10 for electrically energizing the PDIC 10. The second sub circuit portion 120 extends from the main circuit portion 101 and is connected to the two-wavelength LD 20 for electrically energizing the LD 20. The third sub circuit portion 130 (FIG. 1) extends from the main circuit portion 101 and is connected to the actuator 30 which drives the lens holder 65 (FIG. 6) for electrically energizing the actuator 30.

A flexible printed circuit board is used as the flexible printed circuit 100 (FIGS. 1 and 6). An FPC is formed by an insulating sheet on which a plurality of circuit conductors (not shown) are printed, a metal foil (not shown) such as a copper foil which is provided in parallel with the insulating sheet, and a protective layer (not shown) formed on these sheets. In FIGS. 1 and 6, the FPC 100 is shown in simplified form for the sake of convenience and the circuit conductors are omitted.

The LD holder 25 containing the LD 20 (FIGS. 2 and 3), the diffraction grating 70, the prism 80, the intermediate lens 40, the RM 50, the HM 55, the PDIC 10 (FIGS. 1 and 6), and the FPC 100 are mounted in a housing 5. Also, the actuator 30 (FIG. 6) which drives the objective lens 60 to an appropriate position is disposed in the housing 5. The optical pickup device 1 includes the various structural elements as described above.

The housing 5 (FIGS. 2 and 3) includes a housing body 5H (FIGS. 2 and 3) for storing the diffraction grating 70, the prism 80, the intermediate lens 40, the RM 50, the HM 55, the lens holder 65 including the OBL 60 (FIG. 6), and the actuator 30. The outer shape of the housing body 5H is formed by a peripheral wall 5A which includes at least a base wall 5Ab and outer peripheral wall 5B extending in the direction substantially orthogonal to the base wall 5Ab. The diffraction grating 70, the prism 80, the intermediate lens 40, the RM 50, the HM 55, the lens holder 65 holding the OBL 60 (FIG. 6) and the actuator 30 are contained within a large housing portion 5C in the housing body 5H.

Further, the housing 5 includes the housing body 5H, a first guide portion 5I and two second guide portions 5II. Each of the components described above are mounted on the housing body 5H. The first guide portion 5I extends from the housing body 5H and fits with a first guide shaft (not shown). The second guide portions 5II extend from the housing body 5H in the direction opposite to the first guide portion 5I, and fit with a second guide shaft (not shown).

The first guide portion 5I and the second guide portions 5II are integrally molded with the housing body 5H by injection molding. The first guide portion 5I and the second guide portions 5II are formed by the same material as that of the housing body 5H. The method of forming the housing 5 by injection molding makes it possible to manufacture a large number of the housings 5 effectively, even if the housing 5 has a complicated shape as shown in FIGS. 2 and 4.

As shown in FIGS. 1 to 6, the optical pickup device 1 includes at least the LD 20 which emits a laser beam and the housing 5 made of a heat resistant synthetic polymer onto which the LD 20 is mounted. The body of the LD 20 is contained within a holder body 25H of the LD holder 25 which is made of a metal and which externally protects the LD 20. The holder body 25H has a substantially rectangular box shape which can house the LD 20 therein. The heat generated from the LD 20 is transmitted to the LD holder 25 made of a metal. A projecting portion 27 (FIGS. 1, 2 and 4) of a substantially rectangular column shape, which dissipates the heat generated from the LD 20 immediately, is provided on the holder body 25H forming the LD holder 25. The projecting portion 27 is located within the housing portion 5C (FIGS. 1 to 3) of the whole housing 5. More specifically, the projecting portion 27 is positioned within the housing portion 5C enclosed by the peripheral wall 5A of the housing 5.

The structure of the optical pickup device 1 as described above makes it easy to let out the heat generated by the LD 20 through the whole LD holder 25 which is made of a metal and which includes the projecting portion 27 provided on the LD holder 25 for protecting the LD 20. Due to the projecting portion 27 having a substantially rectangular column shape for dissipating the heat generated by the LD 20, which is provided on the holder body 25H of the LD holder 25 containing the LD 20, the surface area of the whole LD holder 25 is increased. The projecting portion 27 formed on the LD holder 25 functions as a heat sink which accelerates heat dissipation from an electrical/electronic component such as the LD 20. Consequently, accumulation of heat in the LD holder 25 containing the LD 20 can be prevented, thereby facilitating heat dissipation through the whole LD holder 25.

This can prevent the problem that the LD 20 cannot emit a laser beam at a fixed wavelength. Specifically, as the temperature increase in the LD 20 is restrained, the LD 20 can emit a laser beam at a fixed wavelength. A heat sink refers to a metal member which absorbs and also dissipates heat generated by a CPU in a computer or the like.

The projecting portion 27 of the LD holder 25 which dissipates the heat generated by the LD 20 is positioned within the housing portion 5C of the whole housing 5. This can also prevent the projecting portion 27 of the LD holder 25 from projecting outwardly from the optical pickup device 1. The projecting portion 27 is situated within the housing portion 5C enclosed by the peripheral wall 5A of the housing 5. This structure prevents the projecting portion 27 of the LD holder 25 from projecting outwardly from the optical pickup device 1 when the optical pickup device 1 is assembled.

Consequently, the optical pickup device 1 as a whole is configured as a compact size device, as shown in FIG. 6. The housing portion 5C of the housing 5 or the housing portion 5C of the whole housing 5 as used herein refers to a housing chamber 5C enclosed by the base wall 5Ab forming the housing body 5H and the outer peripheral wall 5B extending in the direction which is substantially orthogonal with respect to the base wall 5Ab.

Preferably, an alloy containing zinc which is superior in corrosion resistance and cost is used for the LD holder 25. Zinc or aluminum is a nonferrous metal which is superior in corrosion resistance and has a specific gravity smaller than that of iron. With the use of a nonferrous metal such as zinc and aluminum or an alloy containing zinc and aluminum, rusting of the LD holder 25 can be prevented and heat dissipation of the LD holder 25 can be preferably performed.

The projecting portion 27 of the LD holder 25 (FIGS. 1, 2 and 4) is formed both as a heat dissipation section of a substantially rectangular column shape which accelerates heat dissipation of the LD 20 and as a holder support section of a substantially rectangular column shape which prevents the LD holder 25 from being removed off the housing 5 when an inadvertent impact is applied to the housing 5.

More specifically, the projecting portion 27 having a substantially rectangular column shape projecting from the holder body 25H constituting the LD holder 25 is formed as a heat dissipation and support piece which serves both as a heat dissipation bar of a substantially rectangular bar shape which accelerates heat dissipation of the LD 20 and as a holder support bar of a substantially rectangular bar shape which prevents the LD holder 25 from being removed off the housing 5 when an inadvertent impact is applied to the housing 5.

With such a heat dissipation and support piece 27 provided on the LD holder 25, heat is immediately dissipated through the whole of the LD holder 25. In addition, even when an inadvertent impact is applied to the housing 5, it is easy to prevent the LD holder 25 containing the LD 20 from being removed off the housing 5. Consequently, it is possible to provide an optical pickup device 1 which is resistant to damage even if the device is handled somewhat roughly.

The projecting portion 27 of a substantially rectangular column shape projecting on the holder body 25H which constitutes the LD holder 25 is a single projecting portion 27 of a substantially rectangular bar shape which is formed in an elongated rectangular parallelepiped. The housing body 5H constituting the housing 5 (FIGS. 2 and 4) includes, correspondingly to the single projecting portion 27, a receiving portion 5F of a substantially rectangular elongated box shape, into which the projecting portion 27 of the LD holder 25 can be inserted.

The housing 5 configured as described above allows the projecting portion 27 formed projecting on the body 25H of the LD holder 25 containing the LD 20 to be easily inserted into the predetermined receiving portion 5F formed on the body 5H of the housing 5. Accordingly, the LD holder 25 can be easily mounted onto the housing 5.

Further, because the receiving portion 5F of a substantially rectangular elongated box shape into which the single projecting portion 27 of a substantially rectangular bar shape provided on the LD holder 25 can be inserted is formed on the housing 5, it is easy to prevent the problem that the LD holder 25 is removed off the housing 5 causing breakage of the optical pickup device 1, even when the optical pickup device 1 is handled somewhat roughly and consequently an impact is applied to the housing 5 forming the optical pickup device 1. It is therefore possible to provide an optical pickup device 1 which is resistant to damage.

The projecting portion 27 of a substantially rectangular bar shape which is provided on the LD holder 25 (FIGS. 1, 2, and 4) is to be inserted, through an opening portion 5E of a substantially rectangular shape of the housing body 5H forming the housing 5, into the receiving portion 5F of a substantially rectangular elongated box shape. In this manner, the LD holder 25 is inserted into and mounted on the housing 5.

As shown in FIGS. 1 to 6, a plurality of thin-wall heat dissipation fins 28 are provided on the body 25H of the LD holder 25 for dissipating heat of the LD holder 25. With such heat dissipation fins 28 provided on the body 25H of the LD holder 25, it is possible to prevent heat generated by the LD 20 from being accumulated in the LD holder 25. This further prevents a significant change in the wavelength of the laser beam emitted from the LD 20 contained within the LD holder 25.

In addition, with the use of the LD holder 25 which is superior in heat dissipation property, it is possible to prevent the heat from being accumulated in the optical pickup device 1 causing abnormal increase in the temperature of the optical pickup device 1. This can further prevent the optical pickup device 1 from being used under conditions where the temperature changes greatly.

Each heat dissipation fin 28 is formed such that it is engraved onto the holder body 25H rather than projecting from the body 25H of the LD holder 25. Consequently, the plurality of thin-wall heat dissipation fins 28 formed such that they are engraved onto the holder body 25H of the LD holder 25 and the single heat dissipation and support piece 27 of a substantially rectangular bar shape which is provided projecting outwardly from the body 25H of the LD holder 25 are formed as different and separate members.

The projecting portion 27 of a substantially flat plate shape provided to project from the holder body 25H forming the LD holder 25 (FIGS. 1, 2, and 4) is formed in a substantially rectangular elongated bar shape and includes one side surface (a first side surface) 27a having a substantially plane shape and the other side surface (a second side surface) 27b having a substantially plane shape provided on the other side of the first side surface 27b.

Further, the receiving portion 5F provided in the housing body 5H of the housing 5 (FIGS. 2 and 4) is formed in an elongated shape having one side wall (a first side wall) 5Fa of a substantially plane shape corresponding to the one side surface (the first side surface) 27a of the projecting portion 27 of the LD holder 25 and the other side wall (a second side wall) 5Fb of a substantially plane shape corresponding to the other side surface (the second side surface) 27b of the projecting portion 27 of the LD holder 25.

Coupling walls 5G1 (FIG. 2), 5G2 and 5G3 (FIG. 4) of a substantially plane shape for connecting one side wall 5Fa and the other side wall 5Fb, which are integrally formed with the housing 5H of the housing 5, constitute the elongated receiving portion 5F. The coupling walls 5G1 (FIG. 2), 5G2 and 5G3 (FIG. 4) which are integrally formed with the housing body 5H of the housing 5 are provided in a zigzag pattern on the upper and lower portions of the elongated receiving portion 5F of the housing 5.

With this structure, heat generated from the LD 20 contained within the LD holder 25 can escape from the housing 5 without staying within the receiving portion 5F of the housing 5, in which the projecting portion 27 of the LD holder 25 can be received. Specifically, the heat generated by the LD 20 contained within the LD holder 25 escapes out of the housing 5 mainly through each of opening portions 5F1 (FIGS. 2 and 3), 5F2 (FIGS. 4 and 5) and 5F3 of the housing 5 provided in the regions on the upper and lower portions of the receiving portion 5F where the coupling walls 5G1, 5G2, and 5G3 formed in a zigzag pattern are not provided.

In addition, it is possible to prevent significant displacement of the mounting position of the LD holder 25 with respect to the housing 5 even when an inadvertent impact is applied to the housing 5 forming the optical pickup device 1. Specifically, when an inadvertent impact is applied to the optical pickup device 1 including the housing 5, the projecting portion 27 of the LD holder 25 strikes against one side wall 5Fa or the other side wall 5Fb forming the receiving portion 5F, or the coupling walls 5G1, 5G2, and 5G3 provided in a zigzag pattern and connecting the one side wall 5Fa and the other side wall 5Fb. Therefore, when an impact is applied to the optical pickup device 1, because the projecting portion 27 of the LD 25 thus hits against the walls forming the receiving portion 5F, the position of the projecting portion 27 of the LD holder 25 will not be displaced any further. Consequently, even when an inadvertent impact is applied to the housing 5, the problem that the LD holder 25 including 20 is removed off the housing 5 and therefore the optical pickup device 1 is broken can be prevented.

The housing body 5H of the housing 5 includes the receiving space 5F capable of storing the heat dissipation and support piece 27 of the LD holder 25, corresponding to the heat dissipation and support piece 27 provided on the holder body 25H of the LD holder 25 (FIGS. 2 and 4). The heat dissipation and support piece 27 formed so as to project on the holder body 25H of the LD holder 25 is formed as a member which is smaller than the receiving space 5F formed on the body 5H of the housing 5. The heat dissipation and support piece 27 of the LD holder 25 can therefore be inserted into the predetermined receiving space 5F of the housing 5 such that a gap remains between the two members. Specifically, the heat dissipation and support piece 27 of the LD holder 25 is received in the receiving space 5F such that the mounting position of the LD holder 25 with respect to the housing 5 can be adjusted when the LD holder 25 is mounted onto the housing 5.

With the above structure, it is possible to easily adjust the mounting position of the LD 20 contained in the LD holder 25 including the heat dissipation and support piece 27 when the LD 20 is installed onto the housing 5. Because the heat dissipation and support piece 27 of the LD holder 25 can be adjusted with respect to the predetermined receiving space 5F provided on the housing 5, the LD holder 25 including the LD 20 can be mounted onto the housing 5 with precision. Further, the structural elements of the optical path system such as the LD 20, the diffraction grating 70 and the prism 80, can also be mounted with precision.

A guide portion 5Bj is further formed on the housing 5 for facilitating positioning of the LD holder 25 with respect to the housing 5 (FIGS. 1 and 4), and a counterpart guide portion 25Bj which corresponds to the guide portion 5Bj is also provided on the LD holder 25. When mounting the LD holder 25 onto the housing 5, the counterpart guide portion 25Bj of the LD holder 25 is fitted in the guide portion 5Bj of the housing 5, so that the LD holder 25 can be positioned and mounted onto the housing 5.

More specifically, a guide concave portion 5Bj for facilitating adjustment of the mounting position of the LD holder 25 with respect to the housing 5 is provided on one side wall 5Bi of the outer peripheral wall 5B constituting the housing body 5H. Further, a guide convex portion 25Bj for facilitating adjustment of the mounting position of the LD holder 25 with respect to the housing 5 is provided, corresponding to the guide concave portion 5Bj provided on one side wall 5Bi of the peripheral wall 5B constituting the housing body 5H, on one side wall 25Bi of the holder body 25H constituting the LD holder 25.

In the optical pickup device 1 including the guide portions 5Bj and 25Bj as described above, the LD holder 25 containing the LD 20 can be easily mounted onto the housing 5 in a state where the holder 25 is accurately positioned (FIGS. 3 and 5). With the structure in which the LD holder 25 containing the LD 20 can be mounted on the housing 5 with high precision, a highly accurate optical pickup device 1 can be achieved.

Further, because the counterpart guide portion 25Bj of the LD holder 25 fits into the guide portion 5Bj of the housing 5, the LD holder 25 is not removed off the housing 5 easily, even when the optical pickup device 1 is handled somewhat roughly and therefore the housing 5 forming the optical pickup device 1 receives an impact. It is therefore possible to prevent the optical pickup device 1 from being broken. It is also possible to provide the optical pickup device in which the positional adjustment can be easily made and which is resistant to shock.

When the LD holder 25 is mounted onto the housing 5 (FIGS. 1 to 5), the one side wall 25Bi forming the holder body 25H of the LD holder 25 is aligned with the one side wall 5Bi of the outer peripheral wall 5B forming the body 5H of the housing 5. Further, when the LD holder 25 is fitted to the housing 5, a light-curing adhesive 200 (FIGS. 3 and 5) which is cured by applying light thereto is used for performing an adhesion operation to fix the LD holder 25 onto the housing 5. More specifically, when fixing the LD holder 25 onto the housing 5 (FIGS. 1 to 5), an ultraviolet curable adhesive 200 (FIGS. 3 and 5) which is cured by irradiation of ultraviolet ray is used for adhesion, whereby the LD holder 25 is fixed onto the housing 5. In the drawings, the adhesive 200 is shown by black solid regions for the sake of convenience.

With the adhesion process using the light-curing adhesive 200 such as the ultraviolet curable adhesive 200, the LD holder 25 holding the LD 20 is fixed onto the housing 5 easily and rapidly. Irradiation of light onto the light-curing adhesive 200 accelerates the curing action of the light-curing adhesive 200, whereby the LD holder 25 is adhered to the housing 5. More specifically, by irradiating the ultraviolet curable adhesive 200 with ultraviolet rays, the curing action of the ultraviolet curable adhesive 200 is accelerated, so that the LD holder 25 is immediately adhered to the housing 5. Further, with the use of the light-curing adhesive 200 such as the ultraviolet curable adhesive 200 as an adhesive, the LD holder 25 is fixed to the housing 5 with high precision. Thus, a highly precise optical pickup device 1 in which the LD holder 25 is accurately fixed onto the housing 5 can be provided.

The light-curing adhesive 200 such as the ultraviolet curable adhesive 200 (FIG. 3) is applied to one edge portion (first edge portion) 5Bp of the one side wall 5Bi of the outer peripheral wall 5B forming the body 5H of the housing 5 (FIGS. 1 to 3). Specifically, the adhesive 200 is applied to the upper end portion 5Bp of the one side wall 5Bi of the outer peripheral wall 5B forming the housing body 5H.

Also, the light-curing adhesive 200 such as the ultraviolet curable adhesive 200 (FIG. 3) is applied to one edge portion (first edge portion) 25Bp of the one side wall 25Bi forming the body 25H of the LD holder 25 (FIGS. 1 to 3). Specifically, the adhesive 200 is applied to the upper end portion 25Bp of the one side wall 25Bi forming the LD holder body 25H.

The adhesive 200 (FIG. 3) is applied so as to bridge over the one edge portion 5Bp of the one side wall 5Bi forming the body 5H of the housing 5 (FIGS. 1 to 3) and the one edge portion 25Bp of the one side wall 25Bi forming the body 25H of the LD holder 25 (FIG. 3). With solidification of the adhesive 200, the point portion 200 for securely bonding the body 5H of the housing 5 and the body 25H of the LD holder 25 is formed.

Further, the light-curing adhesive 200 such as the ultraviolet curable adhesive 200 (FIG. 5) is applied to the other edge portion (second edge portion) 5Bq of the one side wall 5Bi of the outer peripheral wall 5B forming the body 5H of the housing 5 (FIGS. 4 and 5). Specifically, the adhesive 200 is applied to the other edge portion (second edge portion) 5Bq (FIGS. 4 and 5) on the opposite side of the one edge portion (the first edge portion) 5Bp (FIG. 4) of the one side wall 5Bi. In other words, the adhesive 200 is applied to the lower end portion 5Bp of the one side wall 5Bi of the outer peripheral wall 5B forming the housing body 5H.

Also, the light-curing-adhesive 200 such as the ultraviolet curable adhesive 200 (FIG. 5) is applied to the other edge portion (the second edge portion) 25Bq of the one side wall 25Bi forming the body 25H of the LD holder 25 (FIGS. 4 and 5). Specifically, the adhesive 200 is applied to the other edge portion (the second edge portion) 25Bq (FIGS. 1 to 3) on the opposite side of the one edge portion (the first edge portion) 25Bp (FIGS. 1 to 3) of the one side wall 25Bi. In other words, the adhesive 200 is applied to the lower end portion 25Bp of the one side wall 25Bi forming the LD holder body 25H.

The adhesive 200 (FIG. 5) is applied so as to bridge over the other edge portion 5Bq of the one side wall 5Bi forming the body 5H of the housing 5 (FIGS. 4 and 5) and the other edge portion 25Bq of the one side wall 25Bi forming the body 25H of the LD holder 25. With solidification of the adhesive 200, the joint portion 200 for securely bonding the body 5H of the housing 5 and the body 25H of the LD holder 25 is formed.

By applying the adhesive 200 onto the upper and lower end portions 5Bp, 5Bq, 25Bp, and 25Bq of the housing 5 and the LD holder 25, respectively and then causing the adhesive 200 to solidify so as to form the joint portion 200, the LD holder 25 can be securely fixed to the housing 5. Here, the size of the joint portion 200 ranges between substantially a half a rice grain and the substantially the size of a rice grain.

Examples of ultraviolet curable adhesive, which is one type of light-curing adhesive, include, for example, optical UV adhesives NOA60 and NOA77 manufactured by Norland Products Inc. (US). The ultraviolet curable adhesives such as the optical UV adhesives NOA60 and NOA77 are an acrylic adhesive and a single component ultraviolet curable adhesive which eliminates the need for mixing liquids as required when a two-component ultraviolet curable adhesive is used. Consequently, application of an adhesive is effectively performed at a high speed. Here, "UV" refers to "ultraviolet" and therefore an ultraviolet curable adhesive is referred to as an UV curable adhesive, for example. A two-component ultraviolet curable adhesive, for example, may be used to perform an adhesion process depending on the design specification or the like of the optical pickup device and the flexible printed circuit. Here, two-component ultraviolet curable adhesives include, for example, a two-component epoxy ultraviolet curable adhesive.

Referring to FIGS. 1 and 6, the FPC 100 (FIGS. 1 and 6) for supplying electric current to the LD 20 is mounted on the optical pickup device 1. The connecting portion 123 to which the LD 20 held in the LD holder 25 is connected so as to achieve electrical connection therebetween is provided in the second sub circuit portion 120 of the FPC 100. The terminal portion 24 of the LD 20 which projects outwardly from the LD holder 25 and a conductor portion (not shown) of the connecting portion 123 in the second sub circuit portion 120 of the FPC 100 are soldered, whereby the LD 20 is connected to the FPC 100 for electrical connection between the two (FIG. 6).

Specifically, the terminal portion 24 of the LD 20 which projects outwardly from the LD holder 25 (FIGS. 1 to 5) penetrates the connecting portion 123 of the second sub circuit portion 120 of the FPC 100 by passing through holes 124 (FIGS. 1 and 6) provided in the connecting portion 123 of the second sub circuit portion 120 of the FPC 100. In this state, the terminal portion 24 projecting outwardly from the LD holder 25 (FIG. 6) is soldered onto the circuit conductor (not shown) of the second circuit portion 120 of the FPC 100 for achieving electrical connection with respect to the circuit conductor (not shown) of the FPC 100.

Further, the second sub circuit portion 120 of the FPC 100 is disposed along the outer peripheral wall 5B (FIGS. 1 to 3 and 6) forming the housing 5. The output peripheral wall 5B (FIG. 6) forming the housing 5 extends to the vicinity of the connecting portion 123 of the second sub circuit portion 120 of the FPC 100. A guide wall 5Ba of the outer peripheral wall 5B, which is provided on the outer side of the other side wall 5Fb forming the receiving portion 5F, extends to the vicinity of the connecting portion 123 of the second sub circuit portion 120 of the FPC 100 and guides the second sub circuit portion 120 of the FPC 100.

With the above structure, even when an inadvertent impact is applied to the housing 5 forming the optical pickup device 1, it is easy to prevent the LD holder 25 holding the LD 20 being removed off the housing 5 and therefore prevent the optical pickup device 1 from being damaged. By soldering the terminal portion 24 of the LD 20 which projects outwardly from the LD holder 25 and the conductor portion of the connecting portion 123 of the second sub circuit portion 120 of the FPC 100, the LD holder 25 holding the LD 20 becomes more securely fixed with respect to the housing 5.

In addition, the second sub circuit portion 120 of the FPC 100 is disposed along the guide wall 5Ba of the outer peripheral wall 5B forming the housing 5, and the guide wall 5Ba of the outer peripheral wall 5B forming the housing 5 is provided to extend to the vicinity of the connecting portion 123 of the second sub circuit portion 120 forming the FPC 100. This structure also makes the FPC 100 more securely fixed with respect to the housing 5. This further makes the LD holder 25 holding the LD 20 which is soldered to the connecting portion 123 of the second sub circuit portion 120 forming the FPC 100 stable with respect to the housing 5. Consequently, it is easy to prevent the problem that the LD holder 25 holding the LD 20 is removed off the housing 5 and the optical pickup device 1 is consequently damaged when an inadvertent impact is applied to the optical pickup device 1.

Various electric/electronic components such as the PDIC 10 and the LD 20 are connected, by soldering, to the flexible printed circuit 100 to achieve electrical connection between the two. Accordingly, a heat resistant synthetic polymer such as a polyimide resin which is superior in heat resistance is used for the base portion of the FPC 100. Polyimide is abbreviated as "PI". FPCs whose base portion is formed by a polyimide resin include, for example, NitoFlex (registered trademark) manufactured by Nitto Denko Corporation and Kapton (registered trademark) manufactured by DU PONT-TORAY Co.Ltd.

Products of NitoFlex (registered trademark) by Nitto Denko Corporation include, for example, high precision FPC (double-sided), high precision FPC, micro access FPC, high insulating resistance reliability FPC, high heat resistant FPC, high flex fatigue life FPC, and so on. Products of Kapton (registered trademark) by DU PONT-TORAY include, for example, H type, V type, Super V type, EN type, KJ type and so on. Kapton (registered trademark) by DU PONT-TORAY can be used over the wide temperature range from an extremely low temperature of about −269 degrees centigrade to a high temperature of about +400 degrees centigrade.

Further, so-called lead-free solders, which are solders that give consideration to the environment and contain no lead, are used as a soldering agent. The use of a lead-free solder can prevent the natural environment from being adversely affected by the lead when the optical pickup device 1 or the flexible printed circuit 100 mounted onto the optical pickup device 1, for example, is discarded. Examples of lead-free solders include, for example, ECO SOLDER M30 manufactured by Senju Metal Industrial Co. Ltd. In addition, examples of reflow type lead-free solders include ECO SOLDER L21 manufactured by Senju Metal Industrial Co. Ltd. Here, normal soldering agents may be used in place of the lead-free solders. Examples of normal solder include, for example, SPARKLE PASTE OZ series manufactured by Senju Metal Industrial Co. Ltd.

In an example soldering method, with a reflow soldering agent in a cream form being applied to main portions, for example, the soldering object is stored in a reflow soldering vessel in which the reflow solder is melted under the temperature of about 240 to 250 degrees centigrade and is then gradually cooled, whereby a soldering process of the object is performed. Because the base portion of the FPC 100 is formed by polyimide which can resist the temperature of about 240 to 250 degrees centigrade required for the soldering process, it is possible to prevent the FPC 100 from being deformed by heat, for example.

Here, a heat resistant polyimide which does not cause any defects such as heat distortion when exposed to heat of about 250 to 400 degrees centigrade is used. A device using a polyimide with a heat resistant temperature below about 250 degrees centigrade cannot resist the heat required for the above-described soldering process. On the other hand, a device using a polyimide with a heat resistant temperature of about 400 degrees centigrade or higher is expensive and is not advantageous in terms of mass production. A device using a heat resistant polyimide which does not cause any defects such as heat distortion when exposed to heat of about 300 degrees centigrade, for example, can sufficiently resist the above-described soldering process.

The housing 5 (FIGS. 2 and 4) forming the optical pickup device 1 is formed by a thermoplastic synthetic resin material which can be used for injection molding and which is heat resistant.

By forming the housing 5 of a thermoplastic synthetic resin material which can be used for injection molding and which is heat resistant, the optical pickup device 1 with a reduced weight can be supplied to assembling makers of optical disk apparatuses, for example. There has been a demand for further reduction in weight of an optical pickup device 1 or an optical disk apparatus (not shown) including the optical pickup device 1. In this regard, when the housing 5 formed by a thermoplastic synthetic resin material which can be used for injection molding and which is heat resistant is mounted onto the optical pickup device 1, the optical pickup device 1 with a reduced weight can be obtained. Specifically, by forming the housing 5 using a synthetic resin material, in place of a metallic material, as a base material, reduction in weight of the housing 5 can be achieved.

With regard to heat conductivity, the housing 5 made of a metallic material is superior to the housing 5 made of a synthetic resin. However, because the holder body 25H of the LD holder 25 holding the LD 20 includes the projecting portion 27 of a substantially rectangular column shape for accelerating immediate dissipation of heat generated by the LD 20 itself, it is possible to prevent the heat which is generated by the LD 20 itself from being accumulated within the LD 20 held in the LD holder 25. Consequently, the problem that the wavelength of laser beam emitted from the LD 20 varies thereby prohibiting emission of laser beam at a fixed wavelength from the LD 20 can be solved. More specifically, according to the present invention, the LD 20 can emit a laser beam at a fixed wavelength even when the optical pickup device 1 adopts the housing 5 which uses a synthetic resin in order to achieve reduction in weight of the optical pickup device 1.

Examples of thermoplastic synthetic resin materials which can be used for injection molding and which are heat resistant include polyarylene sulfide resin such as polyphenylene sulfide which is superior in electric characteristics including, for example, heat stability and insulating property, mechanical characteristics, dimensional stability, and so on.

Polyphenylene sulfide is abbreviated as "PPS". Synthetic resin materials using a polyphenylene sulfide resin as a base material include, for example, DIC-PPS_glass fiber reinforced heat resistant series (cross linked PPS) FZ-1130-D5 or the like manufactured by Dainippon Ink and Chemicals, Incorporated. As glass fiber is mixed in a base material, the mechanical characteristics or the like of the housing 5 can be reinforced. In the present embodiment, the housing 5 is formed by PPS.

As described above, the housing 5 is formed by injection molding using a synthetic polymer such as PPS as a base material. By adopting a forming method of the housing 5 based on injection molding, it is possible to effectively manufacture a large amount of housings 5 even when the housing 5 has a complicated shape as shown in FIGS. 2 and 4. Further, with the use of a synthetic resin such as PPS, the housing 5 with a reduced weight compared to a housing made of a metal can be formed, resulting in reduction in weight of the optical pickup device 1. This further results in reduction in weight of the optical disk apparatus (not shown) in which the optical pickup device 1 is equipped.

Alternatively, a nonferrous metal such as zinc and aluminum or an alloy containing zinc or aluminum, for example, may be used in place of a synthetic resin such as PPS, depending on the design specification or the like of the optical pickup device. Zinc and aluminum are nonferrous metals with excellent corrosion resistance and a specific gravity smaller than that of iron.

The process of mounting the LD holder 25 made of a metal, which stores the LD 20 within the holder body 25H and also includes the projecting portion 27 used for heat dissipation and support, onto the housing 5 made of a synthetic resin for assembling the optical pickup device 1 will be now described with reference to FIGS. 1 to 6.

As shown in FIG. 2, the diffraction grating 70, the prism 80, the intermediate lens 40, the RM 50, the HM 55, or the like are mounted within the housing portion 5C formed by the peripheral walls 5A constituting the housing 5. Further, the actuator 30 for moving the objective lens 60 (FIG. 6) to an appropriate position is also formed within the housing portion 5C of the housing 5. In addition, as shown in FIGS. 2 to 5, the holder 25 holding the LD 20 is attached onto the housing 5.

Then, as shown in FIGS. 3 and 5, the ultraviolet curable adhesive 200 for fixing the LD holder 25 to the housing 5 is applied to the LD holder 25 and the housing 5. The ultraviolet curable adhesive 200 is irradiated with ultraviolet rays for curing the adhesive 200, thereby securely fixing the LD holder 25 onto the housing 5.

Subsequently, the mounting portion 108 of the flexible printed circuit 100 including the PDIC (FIG. 1) is aligned over the housing 5, and the LD 20 and other various electric/electronic components such as coils forming the actuator 30 which are provided in the housing 5 are connected to the flexible printed circuit 100 so that electrical connection can be achieved between the two (FIG. 6).

Then, the upper surface of the housing 5 is covered with a cover plate 150 for protecting the various elements within the housing 5. The cover plate 150, which is made of a metal and is superior in heat dissipation, includes a black enclosure member 160 which is made of a synthetic polymer and which is formed to surround the lens holder 65.

The first guide shaft (not shown) fits in the first guide portion 5I of the housing 5 and the second guide shaft (not shown) fits in the second guide portions 5II of the housing 5. The optical pickup device 1 can be then moved while it is supported by the first and second guide shafts. Each of the guide portions 5I and 5II provided on the housing 5 is formed by, as a base material, the same heat resistant synthetic polymer as that used for the housing body 5H, and they are therefore superior in slidability. The housing 5 of the optical pickup device 1 can move along substantially the longitudinal direction of the main circuit portion 101 of the flexible printed circuit 100.

The optical pickup device 1 can be mounted on an optical disk apparatus exclusively used for data reading, which corresponds to CD-ROMs and DVD-ROMs, for example. Further, the optical pickup device 1 can be mounted on an optical disk apparatus corresponding to read-only optical disks such as CD-ROMs and DVD-ROMs, recordable (write-once) optical disks such as CD-Rs, DVD-Rs, and DVD+Rs, and writable/erasable or rewritable optical disks such as CD-RWs, DVD-RWs, DVD+RWs, DVD-RAMs, HD-DVDs, and Blu-ray Discs, for example.

Further, an optical disk apparatus provided with the optical pickup device 1 can be installed in, for example, personal computers such as laptop personal computers (not shown) and desktop personal computers, audio equipment such as CD players, and audio/video equipment (not shown) such as DVD players. Hereinafter, a personal computer will be abbreviated as a "PC". Further, the optical disk apparatus is adaptable to a plurality of media including CD optical disks and DVD optical disks.

The optical disk apparatus is formed as a player (not shown) or the like in which a CD and/or a DVD can be used. A CD player, a DVD player, or a player capable of using both CD and DVD is installed and used in a laptop PC or a stationary (desktop) PC. Desktop computers are computers which can be used on a desk and cannot be transported easily.

Laptop PCs, which require less weight and smaller thickness compared to desktop PCs, are equipped with an optical disk apparatus (not shown) which is formed as a slim drive. Laptop PCs have a different structure from that of desktop PCs. Specifically, a laptop PC includes a display and a personal computer body which are integrally formed. By folding the display onto the personal computer body, the laptop PC is reduced to a thin size. A laptop PC, when folded, serves as a general-use computer having a size of A4 or smaller. A laptop PC is also referred to as a book type PC (a notebook PC) and can be transported easily.

The housing 5 constituting the optical pickup device 1 (FIGS. 1 to 6) can be mounted in a slim laptop PC disk apparatus. Therefore, the housing 5 is formed in a thin and substantially flattened shape.

Because the heat dissipation projecting portion 27 (FIGS. 1, 2 and 4) for immediately dissipating heat generated from the LD 20 is formed on the holder body 25H forming the LD holder 25, the optical pickup device 1 can function normally even when the optical pickup device 1 including the LD 20 and the LD holder 25 is mounted on a laptop PC disk apparatus which may be exposed to more severe conditions of operating temperatures than those of a desktop PC disk apparatus.

Laptop PCs recently developed have improved performance and also tend to have a smaller size, less weight and less thickness. Optical pickup devices are also being reduced in size, weight and thickness. Further, with the development of performance, laptop PCs generate a large amount of heat. Thus, laptop PCs are smaller than desktop PCs, and the interior of laptop PCs is likely to have a higher temperature than that of desktop PCs due to improvement in performance of laptop PCs. Consequently, it is likely that the optical pickup device 1 provided in a laptop PC disk device is exposed to a high temperature and is affected by heat. The optical pickup device 1 provided in a laptop PC disk device is used under the temperature conditions of about 0 degrees centigrade to 70 degrees centigrade, for example.

However, the temperature increase of the LD 20 as described above can be suppressed when the LD holder 25 holding the LD 20 includes the heat dissipation projecting portion 27 for immediately dissipating heat generated from the LD 20. Reduction in the temperature increase of the LD 20 allows the LD 20 to emit a laser beam at a fixed wavelength. It is therefore possible to prevent the wavelength of laser beam emitted from the LD 20 of the optical pickup device 1 provided in a laptop PC disk device from varying significantly.

The optical pickup device of the present invention is not limited to the shown examples. For example, the optical pickup device of the present invention may be installed in PCs or audio/video equipment provided with a cooling device such as a cooling fan. The optical pickup device of the present invention may alternatively be installed in PCs or audio/video equipment which are not provided with a cooling device such as a cooling fan.

Further, the present invention is applicable to an optical pickup device in which the first sub circuit portion 110 constituting the flexible printed circuit 100 includes a support plate made of aluminum or a support plate made of a heat resistant synthetic resin, or to an optical pickup device in which the first sub circuit portion 110 constituting the flexible printed circuit 100 does not include a support plate made of aluminum or a support plate made of a heat resistant synthetic resin.

While the preferred embodiment of the present invention has been described using specific terms, such description is for illustrative purposes only, and it is to be understood that changes and variations may be made without departing from the spirit or scope of the appended claims.

What is claimed is:

1. An optical pickup device comprising:
a light emitting element for emitting a laser beam; and
a housing in which the light emitting element is mounted,
wherein the housing is formed using a synthetic resin material,
the light emitting element is contained in a holder for protecting the light emitting element,
the housing includes a guide portion which facilitates positioning of the holder with respect to the housing,
the holder is a projecting portion for dissipating heat generated by the light emitting element and includes a counterpart guide portion corresponding to the guide portion of the housing,
the projecting portion is located within the housing, and
when the holder is mounted onto the housing, the counterpart guide portion of the holder is fitted in the guide portion of the housing, whereby the holder is mounted onto the housing while the holder is being positioned with respect to the housing.

2. An optical pickup device according to claim 1, wherein the projecting portion serves both as a heat dissipation portion for increasing heat dissipation of the light emitting element and as a holder support portion for preventing the holder from being removed from the housing when an impact is applied to the housing.

3. An optical pickup device according to claim 1, wherein the projecting portion is formed as a single projecting portion, and
a receiving portion into which the projecting portion can be inserted is provided in the housing corresponding to the projecting portion.

4. An optical pickup device according to claim 1, wherein
a receiving portion into which the projecting portion can be inserted is provided in the housing corresponding to the projecting portion of the holder,
the projecting portion is formed in a smaller size than the receiving portion and can be inserted into the receiving portion with a gap left between the projecting portion and the receiving portion, and
when the holder is mounted onto the housing, the projecting portion is received within the receiving portion such that a mounting position of the holder with respect to the housing can be adjusted.

5. An optical pickup device according to claim 1, wherein an ultraviolet curable adhesive which is cured by irradiation of ultraviolet rays is used to fix the holder onto the housing.

6. An optical pickup device according to claim 1, wherein
a flexible printed circuit for supplying electric current to the light emitting element is provided, the flexible printed circuit including a connecting portion to which the light emitting element is connected,
a terminal portion projecting from the holder and a conductor portion of the connecting portion of the flexible printed circuit are soldered, whereby the light emitting element is connected to the flexible printed circuit so as to achieve electrical connection therebetween, and
the flexible printed circuit is disposed along a peripheral wall constituting the housing, the peripheral wall extending to the vicinity of the connecting portion.

7. An optical pickup device according to claim 1, wherein the housing can be mounted on a disk apparatus for a laptop computer.

8. An optical pickup device comprising:
a light emitting element for emitting a laser beam; and
a housing in which the light emitting element is mounted, wherein
the light emitting element is contained in a holder for protecting the light emitting element,
the holder includes a projecting portion for dissipating heat generated by the light emitting element,
the projecting portion is formed in a substantially rectangular bar shape and includes a first side surface and a second side surface which is provided on a side surface opposite to the first side surface;
a receiving portion includes a first side wall corresponding to the first side surface and a second side wall corresponding to the second side surface;
coupling walls for connecting the first side wall and the second side wall are provided, the coupling walls being provided on upper and lower portions of the receiving portion in a zigzag pattern,
the receiving portion into which the projecting portion can be inserted is provided in the housing corresponding to the projecting portion; and
the projecting portion is located within the housing.

* * * * *